Jan. 24, 1933.  C. M. JOHNSON  1,895,222
AIRPLANE SAFETY BELT
Filed April 6, 1932
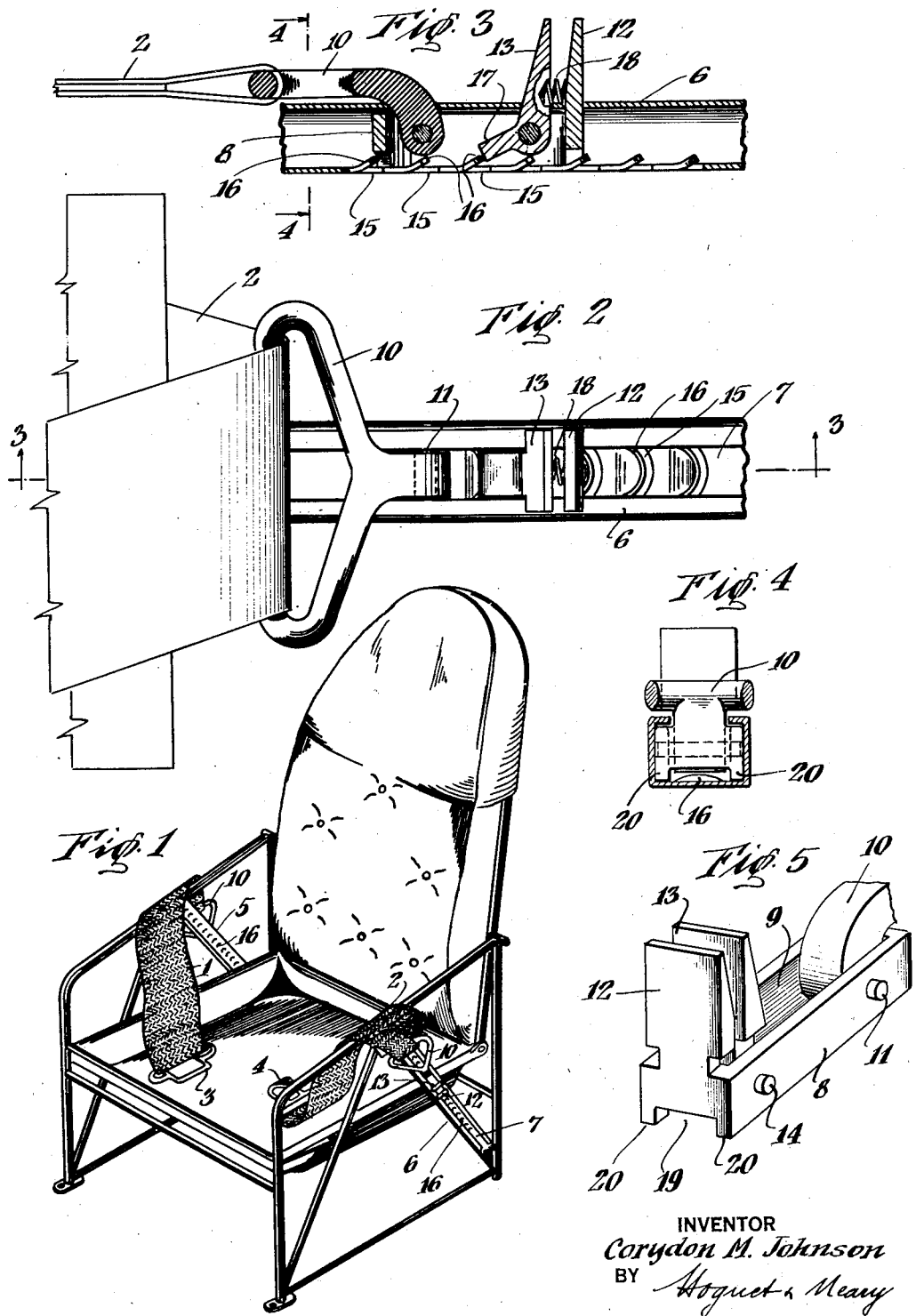
INVENTOR
Corydon M. Johnson
BY Hoquet & Meary
ATTORNEYS Patented Jan. 24, 1933

1,895,222

UNITED STATES PATENT OFFICE

CORYDON M. JOHNSON, OF FARMINGDALE, NEW YORK, ASSIGNOR TO THE AVIATION PATENT AND RESEARCH CORPORATION, A CORPORATION OF NEW YORK

AIRPLANE SAFETY BELT

Application filed April 6, 1932. Serial No. 603,506.

This invention relates in general to airplane safety devices and more particularly to airplane safety belts.

An object of the invention is to provide an airplane safety belt which will be suitable for use especially in connection with passenger chairs in cabin transport airplanes and which will be capable of ready adjustment for the comfort and safety of persons of various sizes.

The conventional safety belt is rarely used by airplane transport passengers, due to the fact that there is little or no provision made for the difference in size of the passengers. It may be true that strictly speaking some of the safety belts in use are adjustable as to size but such adjustment is brought about by manipulation entailing such a degree of inconvenience which would make the passenger feel that the belt is more trouble than it is worth. Any degree of discomfiture to the passenger in the matter of a safety belt accentuates the idea that he is a flying prisoner in a strait jacket.

It is therefore an object of this invention to provide such a conveniently adjustable safety belt that the passenger will welcome its use and the protection which it affords.

It is a further object to provide a belt which in itself does not need to be adjusted but the effective adjustment of which may be effected by a simple adjustment of the device by which it is connected to the chair which carries it.

It is a further object to provide a simple and fool proof adjustable safety belt connection, the adjustment devices of which are located and operable with the maximum ease by virtually instinctive actions on the part of the passenger while in the normal sitting position.

With the foregoing and other objects in view the invention consists in the combination of parts and in the details of construction hereinafter set forth in the following specification and appended claims, certain embodiments being illustrated in the accompanying drawing, in which:

Figure 1 is a view in perspective of the chair with the safety belt attached thereto;

Figure 2 is an enlarged view in detail of the adjustable connecting device;

Figure 3 is a view in section taken along line 3—3 of Figure 2;

Figure 4 is a view in cross section taken along line 4—4 of Figure 3;

Figure 5 is an enlarged view in perspective of the adjustable connecting element.

Referring more particularly to the drawing, Figure 1 shows a chair of the type frequently employed in passenger transport airplanes, it being preferably built of light metal. The safety belt comprises two pieces 1 and 2 with a quick release fastening device for connecting the two free ends. This fastening device may comprise the conventional loop 3 attached to the piece 1, and a hook 4 connected to the end of belt piece 2. The invention is not concerned with the particular construction of this fastening device 3 and 4 as they are well known and accepted in the art.

One of the bracing elements on each side of the chair, namely 5 and 6, is made larger than the remaining bracing elements and each is channeled at 7 to receive in slideable relation the adjustable fastening device for the other ends of the belt pieces 1 and 2. The fastening device consists primarily in a sliding bolt 8 which is recessed at 9 to receive a loop member 10 pivotally connected thereto at 11. This loop member is adapted to engage one end of the belt piece, as shown in Figures 1 and 3. One end of the bolt member terminates in a flange 12 and adjacent thereto is a similar member 13 pivotally connected at 14 to the bolt and adapted to swing within the recess toward and away from the integral flange 12. The inner side of the channeled frame 6 may be formed with a series of perforations made by cutting a portion of the wall and pushing inwardly on the wall adjacent the perforations so as to form a series of flanges. Such perforations and flanges are indicated in Figure 3 at 15 and 16, respectively.

As shown particularly in Figure 3, the pivoted member 13 is provided with an extension 17 so as to form a pawl. A compression spring 18 is arranged between the pawl 13 and the flange 12 so as to normally force pawl 13 away from the flange 12. The sliding bolt 8 is also recessed on its underneath side at 19 so as to form a pair of legs 20 upon which the bolt slides in the channel frame 6. The flanges 16 are centrally located so that the extension 17 of the pawl 13 is the only part of the adjusting bolt assembly which ever comes in contact with the flanges 16.

It will further be seen that a hand engagement of the pawl 13 and 12 and the squeezing of the two together forces the pawl 13 to be rotated in such a manner that the extension 17 becomes disengaged from the locked and adjusted position shown in Figure 3, in which position the bolt and consequently the belt are restrained from any movement.

By reference again to Figure 1, which showing is complete with the exception of the fact that the seat pad has not been placed in the bottom of the chair, it will be seen that the hand adjusting locking bolt devices are located in the most convenient position for operation while the occupant is in sitting position. The sequence of fastening the safety belt over the lap of the occupant is as follows. The occupant first sits in the chair, lays the belt across his lap and fastens the two ends together by engaging the hook 4 with the loop 3. This is done usually, however, after adjusting bolt 8 has been adjusted so as to provide for the maximum effective length of the belt. Having thus secured the two ends together across his lap, the occupant then merely grasps the two hand adjusting devices on both sides of the chair, and while the pawl 13 and the flange 12 are thus grasped between the fingers of each hand, the two bolts 8 are pushed downwardly until the belt fits snugly but comfortably across the lap of the wearer. As the spring 18 is the only resilient element in the entire arrangement, it is only necessary to release the hand grasp of the pawl 13 to allow the spring 18 to force the extension 17 into locked engagement with one of the various flanges 17 of the channel chain.

It is not necessary, however, for any further manipulation of these adjustment devices in the event that the occupant desires to release the strap from across his lap. This is because I prefer the use of such a loop and hook fastening device 3 and 4 as is in common use and the release of which may be easily accomplished, practically instantaneously, with a minimum of effort.

I claim:

1. In combination with a chair, a restraining belt for the occupant thereof, said belt comprising two pieces with a quick release fastening device for the ends thereof, and means for connecting said pieces to said chair, said connecting means being adjustable for varying the effective length of said belt, said means comprising a channeled frame and a locking bolt assembly slidably arranged therein.

2. In combination with a chair, a restraining belt for the occupant thereof, said belt comprising two pieces with a quick release fastening device for the ends thereof, and means for connecting said pieces to said chair, said connecting means being adjustable for varying the effective length of said belt, said means comprising a channeled frame and a locking bolt assembly slidably arranged therein, a belt engaging loop carried by said bolt, a series of internal flanges carried by said channeled frame, and a hand operated spring pressed pawl for automatically engaging said flanges and for allowing manual disengagement.

3. In combination with a chair, a restraining belt for the occupant thereof, said belt comprising two pieces with a quick release fastening device for the ends thereof, and means for connecting said pieces to said chair, said connecting means being adjustable for varying the effective length of said belt, said means comprising a channeled frame and a locking bolt assembly slidably arranged therein, a belt engaging loop carried by said bolt, a series of internal flanges carried by said channeled frame, and a hand operated spring pressed pawl for automatically engaging said flanges and for allowing manual disengagement, said bolt being recessed to provide a pair of runners therefor in its sliding engagement with said channeled frame, the flanges of said channeled frame being centrally disposed so as to allow engagement thereof by pawl alone.

In testimony whereof, I have signed my name to this specification this 4th day of April, 1932.

CORYDON M. JOHNSON.